Figure 1:
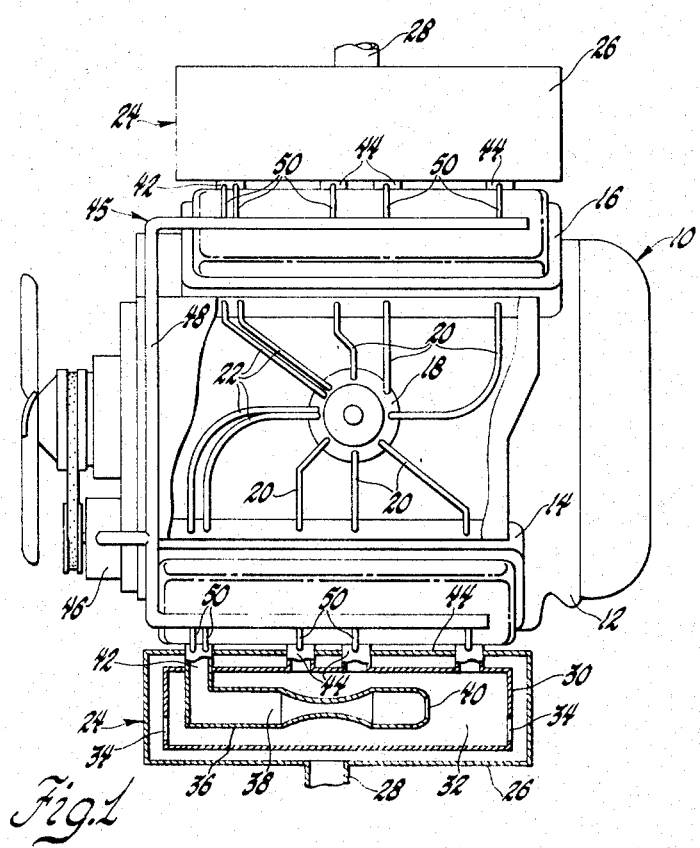

United States Patent [19]
Sohwing

[11] 3,785,153
[45] Jan. 15, 1974

[54] ENGINE WITH EXHAUST REACTOR ARRANGED FOR EARLY IGNITION

[75] Inventor: Richard C. Schwing, Troy, Mich.

[73] Assignee: General Motors Corporation, Detroit, Mich.

[22] Filed: Oct. 25, 1972

[21] Appl. No.: 300,830

[52] U.S. Cl.................... 60/303, 60/282, 60/305, 23/277 C
[51] Int. Cl. ................... F02b 75/10, F01n 3/10
[58] Field of Search................ 60/274, 282, 284, 60/302, 303, 304, 305, 285; 23/277 C, 288 F

[56] References Cited
UNITED STATES PATENTS

| | | | |
|---|---|---|---|
| 3,413,803 | 12/1968 | Rosenlund | 60/282 |
| 3,703,082 | 11/1972 | Santiago | 60/282 |
| 3,708,980 | 1/1973 | Truxell | 60/900 |

Primary Examiner—Douglas Hart
Attorney—J. L. Carpenter et al.

[57] ABSTRACT

In a preferred embodiment, a V-type internal combustion engine is provided with a pair of exhaust manifold reactors, one for each bank, each manifold reactor has a main reaction chamber connected with all but one of the cylinders of its respective bank and a smaller ignition chamber inside the main chamber and connected with the remaining cylinder of each bank. During engine start-up, excess fuel is supplied to the cylinders connected with the ignition chambers forming a richer than normal exhaust to which excess secondary reaction air is added. This mixture passes through the ignition chamber where it receives heat from the surrounding exhaust gases in the main chamber and is ignited, causing combustion to propagate into the leaner mixture in the main chamber so that early start-up of the reaction process results.

3 Claims, 2 Drawing Figures

PATENTED JAN 15 1974  3,785,153

ENGINE WITH EXHAUST REACTOR ARRANGED FOR EARLY IGNITION

This invention relates to internal combustion engines and more particularly to exhaust manifold reactors for and in combination with internal combustion engines arranged to obtain early start-up of the combustion process in the exhaust reactors during engine warm-up.

It is known in the internal combustion engine field to provide engine exhaust reactors such as manifold reactors to provide further burning of combustibles such as hydrocarbons and carbon monoxide in the engine exhaust gases so as to reduce the emissions of such combustibles from the engine. Such exhaust reactors may simply consist of an enlarged and insulated chamber replacing the usual exhaust manifold and are preferably provided with baffles so as to provide for extended residence time in the reactor of exhaust gases passing from the engine to the reactor exhaust outlet. The engine is usually supplied with means for adding secondary air to the engine exhaust gases before or upon their entry into the reactor in order to provide for substantially complete elimination of combustibles in the exhaust gases through further combustion taking place in the reactor.

While exhaust reactors may be very efficient in the elimination of undesired combustibles from the exhaust, when their steady state condition of operation has been reached, difficulty is often experienced after engine starting and during warm-up in bringing such reactors up to a temperature at which the exhaust products and air will ignite. Early ignition of the exhaust combustibles is desirable, since, until such ignition takes place, the combustibles may pass unchanged through the reactor and to atmosphere.

The present invention provides manifold reactor arrangements and engine modifications which aid in the early ignition of combustibles in exhaust reactors by (1) providing an extended residence time for a selected portion of the exhaust gases, (2) providing a higher proportion of combustibles and air in the selected portion of the gases subject to the longer residence time, and (3) providing for heating of the selected rich ignitable gases through heat transfer from a blanket of hotter exhaust gas which is not being further cooled by a large quantity of dilution air.

Figure 2:
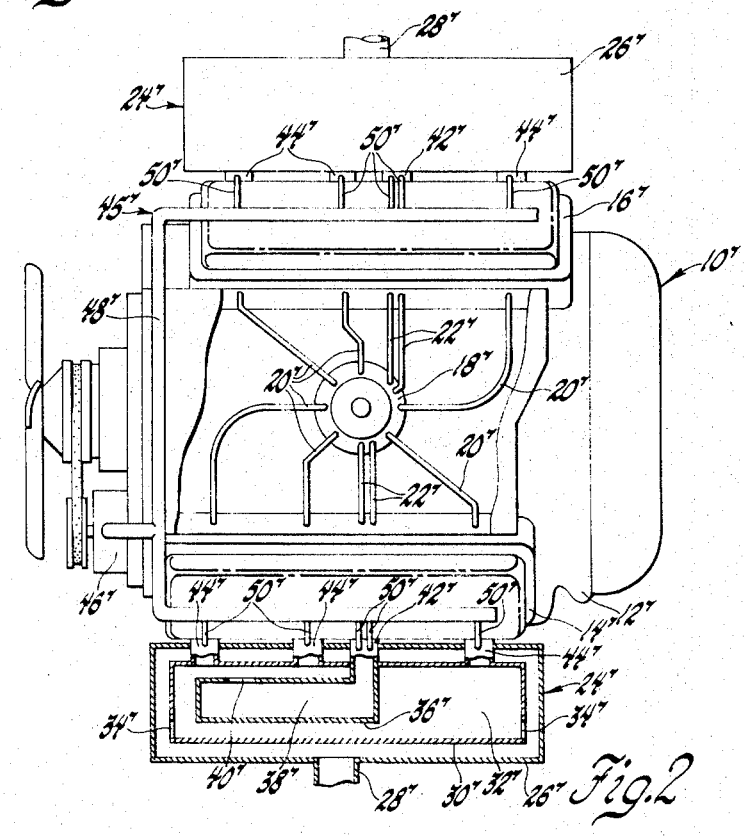

Other advantages and features of the invention will be more fully understood from the following description of certain embodiments chosen for purposes of illustration, taken together with the accompanying drawing:

In the drawing:

FIG. 1 is a plan view of a V-type internal combustion engine with exhaust reactors arranged according to the invention and having one of the exhaust reactors shown in cross-section to illustrate its internal construction; and, FIG. 2 is a plan view of a V-type internal combustion engine having exhaust reactors formed according to an alternative embodiment and having one of the exhaust reactors shown in cross-section to illustrate its internal construction.

Referring now to the drawing in detail, numeral 10 generally indicates an internal combustion engine having a cylinder block 12 with a pair of cylinder banks 14 and 16, each containing four aligned cylinders defining combustion chambers, not shown. Engine 10 is provided with a conventional inlet manifold, not shown, for supplying air to the various combustion chambers and with a continuous manifold fuel injection system 18 arranged to provide fuel to the inlet manifold passages for mixture with the air to be delivered to the various combustion chambers.

In the disclosed embodiment, the fuel injection system is arranged with single distribution tubes 20 connected with individual nozzles, not shown, in the manifold inlet passages leading to the rear six cylinders of the engine so that equal amounts of fuel are distributed to these cylinders under all engine operating conditions. The injection system feeds the front two engine cylinders through double distribution tubes 22 which supply two nozzles in each passage to the front combustion chamber so that a higher proportion of fuel may be supplied to the front cylinders when desired, giving these cylinders a richer than normal mixture.

Engine 10 is also provided with a pair of exhaust reactor manifolds 24, one mounted on each cylinder bank. The reactor manifolds are of similar construction and each include an exterior housing 26 of generally cylindrical configuration and including an exhaust outlet 28. A cylindrical inner housing 30 is located within and spaced from the walls of the exterior housing 26 and forms a main reaction chamber 32. Outlet openings 34 in the ends of the inner housing provide a flow path for gases from the main reaction chamber 32 around the inner housing to the centrally located exhaust outlet 28. A cylindrical inner baffle 36, preferably formed of stainless steel or other heat conducting metal, extends longitudinally within the main reaction chamber to form an ignition chamber 38 extending within and in heat exchange relation with the gases in the main reaction chamber 32 through the walls of the baffle 36. An outlet opening 40 at one end of the baffle 36 connects the ignition chamber 38 with the main chamber 32.

The ignition chamber 38 of each reactor is connected at the ends opposite its outlet opening 40 with the front combustion chamber of its respective bank of the engine through an inlet port 42 which connects with the respective front combustion chamber through its respective exhaust port, not shown. The main reaction chamber 32 of each reactor is in turn directly connected with the three rear combustion chambers of its respective bank by means of inlet ports 44 which connect directly with the respective exhaust ports of their associated combustion chambers.

Engine 10 is further provided with a secondary air supply system 45 for supplying air to the engine exhaust gases as they pass from the combustion chambers to the reactor manifolds. The secondary air system includes an engine driven air pump 46 connecting through a distribution manifold 48 with individual air supply tubes 50 leading to the inlet ports of the reactor manifolds. Dual tubes 50 are provided between the manifold 48 and the inlet ports 42 to the ignition chambers so that additional air may be provided to the exhaust gases passing from the front combustion chambers of the engine.

In operation, air-fuel mixture supplied to the engine combustion chambers is burned to develop power, the exhaust gases being delivered through inlet ports 42, 44 to the manifold reactors, along with secondary air supplied by the secondary air system. Here the mixture of exhaust gases containing combustibles such as hydrocarbons and carbon monoxide are burned in the presence of the secondary air when the combination of residence time and temperature in the manifold are sufficient to cause ignition and support combustion.

Early ignition of the exhaust gas-air mixtures is aided by the passage of the gases from the front cylinders of the engine through the ignition chambers 38 which extends the residence time of these gases in the reactor manifold and promotes their early ignition. To further assist the ignition process, additional fuel may be provided to the front engine cylinders through the double distribution tubes 22 so that the exhaust gases from the front cylinders are richer in fuel and thus more easily ignited in the reactors.

In order to provide proper mixtures of air for the excess fuel in the front cylinders, the secondary air supply system may provide excess air to the exhaust gases passing from the front combustion chambers to the ignition chambers 38. The addition of this excess air has a tendency to cool the exhaust gases coming from the front combustion chambers while the exhaust gases from the remaining combustion chambers, which are delivered directly to the main reaction chambers 32 of the reactor manifolds, are maintained at higher temperatures, since they are not excessively diluted with air or fuel. Thus the diluted richer mixtures in the ignition chambers 38 are heated by the surrounding hotter gases in the reaction chambers 32 through heat exchange through the inner baffles 36 which form the walls of the ignition chambers. This heating of the ignition chamber gases further promotes early ignition in these chambers.

The result of the engine and reactor arrangements is that ignition occurs early in the fuel and air rich exhaust gases supplied to the ignition chambers 38 of the reactors and the flame then propagates into the main chambers 32 causing combustion of the remaining gases with a lower proportion of combustibles and air. Once combustion is initiated, the heat developed continues combustion in the reactor manifold under normal operating conditions and, if desired, the delivery of excess fuel and air to the front engine combustion chambers may be reduced to normal amounts equivalent to the other cylinders.

FIG. 2 of the drawing shows an engine and reactor arrangement somewhat similar to FIG. 1 but having exhaust reactors of slightly different construction in that the inner baffles 36' defining ignition chambers 38' are connected through inlet passages 42' to the third combustion chambers of each bank of the engine. Also, the fuel injection and secondary air systems 18', 45' are arranged to supply excess fuel and air respectively to these third combustion chambers rather than the first combustion chambers as in the first embodiment.

Numerous other arrangements of exhaust reactors and engine fuel and air systems could be provided in accordance with the basic principles of the inventive concepts disclosed. Such variations should be considered within the scope of the braoder aspects of the invention which is to be limited only by the language of the following claims:

I claim:

1. An exhaust manifold reactor in combination with an internal combustion engine having a plurality of combustion chambers and an exhaust port from each combustion chamber, said manifold reactor comprising
a housing defining a main reaction chamber,
first inlet passage defining means connecting said main reaction chamber directly with a plurality but not all of said engine exhaust ports,
baffle means defining an ignition chamber connecting with said main chamber, said baffle means being formed from heat conducting metal and at least in part separating said ignition chamber from said main chamber so as to form a heat conducting path therebetween,
second inlet passage means directly connecting said ignition chamber with one of said combustion chambers not directly connected with said main chamber, said second inlet passage means being spaced from the connection of said main and ignition chambers to provide for extended residence of exhaust gases from said one combustion chamber in said ignition chamber before passing into said main chamber, and
exhaust passage means from said main chamber and spaced from said first inlet passage means and from the connection of said main and ignition chambers to provide for extended residence of engine exhaust gases in said main chamber before being exhausted therefrom.

2. An exhaust manifold reactor for use with an internal combustion engine having a plurality of combustion chambers and a plurality of exhaust ports from said combustion chambers, said manifold reactor comprising
a housing defining a main reaction chamber,
a plurality of spaced inlet ports connecting with said reaction chamber and adapted for connection with certain of said engine exhaust ports,
exhaust port means spaced from said inlet ports to provide an extended flow path for the passage of exhaust gases through said main reaction chamber,
a generally cylindrical baffle disposed within said main reaction chamber and defining, inwardly of said baffle, an ignition chamber within and in heat exchange relation with said main reaction chamber, said baffle having an outlet opening communicating said main reaction chamber and said igniti0n chamber at a point nearer said inlet ports than said exhaust port means, and
a secondary inlet port connecting with said ignition chamber at a location spaced from said baffle outlet opening to provide an extended gas flow path therebetween, said secondary inlet port being spaced from said first-named inlet ports and adapted to be connected with One of said engine exhaust ports not connected to said first-named inlet ports.

3. An internal combustion engine comprising
means defining a plurality of combustion chambers in which air-fuel mixtures are cyclically burned to develop power,
means to supply air and fuel to said combustion chambers in predetermined desired ratios for combustion, said air-fuel supply means being arranged to supply, at least during engine warm-up operation, a higher proportion of fuel to air to at least one of said combustion chambers than to others,
an exhaust reactor having an enlarged main reaction chamber and a smaller ignition chamber within said main chamber and in heat exchange relation therewith, said ignition chamber being connected with said main reaction chamber, separate passage means connecting said one combustion chamber with said ignition chamber and connecting each of said other combustion chambers with said main reaction chamber, and secondary air supply means connected to each of said passage means to supply air thereto for burning in the reactor of combustibles in the exhaust gases, said secondary air supply means being arranged to supply a proportionally greater amount of air to the passage means from said one combustion chamber than to the passage means from said other combustion chamber to provide sufficient air for burning the excess fuel in the exhaust gases of said one combustion chamber.

* * * * *